US008540800B2

(12) United States Patent
Liu et al.

(10) Patent No.: US 8,540,800 B2
(45) Date of Patent: Sep. 24, 2013

(54) MICROPOROUS UZM-5 INORGANIC ZEOLITE MEMBRANES FOR GAS, VAPOR, AND LIQUID SEPARATIONS

(75) Inventors: Chunqing Liu, Schaumburg, IL (US); Jaime G. Moscoso, Mount Prospect, IL (US); Stephen T. Wilson, Libertyville, IL (US)

(73) Assignee: UOP LLC, Des Plaines, IL (US)

( * ) Notice: Subject to any disclaimer, the term of this patent is extended or adjusted under 35 U.S.C. 154(b) by 282 days.

(21) Appl. No.: 13/052,720

(22) Filed: Mar. 21, 2011

(65) Prior Publication Data

US 2012/0240763 A1    Sep. 27, 2012

(51) Int. Cl.
*B01D 53/22* (2006.01)
*B01D 71/02* (2006.01)

(52) U.S. Cl.
USPC ........... 95/45; 95/47; 95/49; 95/50; 95/51; 95/54; 95/55; 96/4; 96/11; 502/4; 427/372.2

(58) Field of Classification Search
USPC ............... 95/45, 47, 49, 50, 51, 52, 54, 55; 96/4, 11, 12; 502/4, 60, 62, 64; 427/372.2
See application file for complete search history.

(56) References Cited

U.S. PATENT DOCUMENTS

| | | | |
|---|---|---|---|
| 6,388,157 B1 | 5/2002 | Jan et al. | |
| 6,388,159 B1 | 5/2002 | Jan et al. | |
| 6,613,302 B1* | 9/2003 | Moscoso et al. | 423/718 |
| 6,756,030 B1 | 6/2004 | Rohde et al. | |
| 6,982,074 B2 | 1/2006 | Jan et al. | |
| 7,578,993 B2 | 8/2009 | Lewis et al. | |
| 2005/0065016 A1 | 3/2005 | Lewis et al. | |
| 2005/0204916 A1 | 9/2005 | Falconer et al. | |
| 2008/0295691 A1 | 12/2008 | Liu et al. | |
| 2009/0114089 A1* | 5/2009 | Liu et al. | 95/45 |
| 2009/0149565 A1 | 6/2009 | Liu et al. | |
| 2009/0277837 A1* | 11/2009 | Liu et al. | 95/45 |

FOREIGN PATENT DOCUMENTS

| | | |
|---|---|---|
| WO | 0236489 A1 | 5/2002 |
| WO | 0236491 A1 | 5/2002 |
| WO | 03068679 A1 | 8/2003 |

OTHER PUBLICATIONS

Blackwell, "Open-Framework Materials Synthesized in the TMA+/TEA+ Mixed-Template System: The New Low Si/Al Ratio Zeolites UZM-4 and UZM-5", Angew. Chem. Int. Ed. 2003, 42, 1737-1740.
Kusakabe, "Formation of a Y-Type Zeolite Membrane on a Porous alpha-Alumina Tube for Gas Separation", Ind. Eng. Chem. Res. 1997, 36, 649-655.
Kusakabe, "Gas Permeation Properties of Ion-Exchanged Faujasite-Type Zeolite Membranes", AIChE Journal, Jun. 1999, vol. 45, No. 6, pp. 1220-1226.

* cited by examiner

*Primary Examiner* — Jason M Greene
(74) *Attorney, Agent, or Firm* — Mark Goldberg

(57) ABSTRACT

The present invention discloses microporous UZM-5 zeolite membranes, methods for making the same, and methods of separating gases, vapors, and liquids using the same. The small-pore microporous UZM-5 zeolite membrane is prepared by two different methods, including in-situ crystallization of one or more layers of UZM-5 zeolite crystals on a porous membrane support, and a seeding method by in-situ crystallization of a continuous second layer of UZM-5 zeolite crystals on a seed layer of UZM-5 zeolite crystals supported on a porous membrane support. The membranes in the form of disks, tubes, or hollow fibers have superior thermal and chemical stability, good erosion resistance, high $CO_2$ plasticization resistance, and significantly improved selectivity over polymer membranes for gas, vapor, and liquid separations.

14 Claims, No Drawings

MICROPOROUS UZM-5 INORGANIC ZEOLITE MEMBRANES FOR GAS, VAPOR, AND LIQUID SEPARATIONS

BACKGROUND OF THE INVENTION

This invention relates to high selectivity microporous UZM-5 zeolite membranes. In addition, the invention relates to methods of making and using these microporous UZM-5 zeolite membranes.

Gas separation processes with membranes have undergone a major evolution since the introduction of the first membrane-based industrial hydrogen separation process about two decades ago. The design of new materials and more efficient methods continue to advance membrane gas separation processes.

The gas transport properties of many glassy and rubbery polymers have been measured as part of the search for materials with high permeability and high selectivity for potential use as gas separation membranes. Unfortunately, an important limitation in the development of new membranes for gas separation applications is a well-known trade-off between permeability and selectivity of polymers. By comparing the data of hundreds of different polymers, Robeson demonstrated that selectivity and permeability seem to be inseparably linked to one another, in a relation where selectivity increases as permeability decreases and vice versa.

Despite concentrated efforts to tailor polymer structure to improve the separation properties of polymer membranes, current polymeric membrane materials have seemingly reached a limit in the trade-off between productivity and selectivity. For example, many polyimide and polyetherimide glassy polymers such as Ultem® 1000 have much higher intrinsic $CO_2/CH_4$ selectivities ($\alpha_{CO2/CH4}$) (~30 at 50° C. and 791 kPa (100 psig) pure gas tests) than cellulose acetate (~22), which are more attractive for practical gas separation applications. These polyimide and polyetherimide glassy polymers, however, do not have outstanding permeabilities attractive for commercialization compared to current commercial cellulose acetate membrane products, consistent with the trade-off relationship reported by Robeson. In addition, gas separation processes based on glassy polymer membranes frequently suffer from plasticization of the stiff polymer matrix by sorbed penetrant molecules such as $CO_2$ or $C_3H_6$. Plasticization of the polymer is represented by membrane structure swelling and a significant increase in the permeabilities of all components in the feed and occurs above the plasticization pressure when the feed gas mixture contains condensable gases. Plasticization therefore decreases the selectivity of the membrane.

On the other hand, inorganic microporous molecular sieve membranes such as zeolite membranes have the potential for separation of gases under conditions where polymeric membranes cannot be used, thus taking advantage of the superior thermal and chemical stability, good erosion resistance, and high plasticization resistance to condensable gases of the zeolite membranes.

Microporous molecular sieves are inorganic microporous crystalline materials with pores of a well-defined size ranging from about 0.2 to 2 nm. Zeolites are crystalline aluminosilicate compositions which are microporous and which have a three-dimensional oxide framework formed from corner sharing $AlO_2$ and $SiO_2$ tetrahedra. Numerous zeolites, both naturally occurring and synthetically prepared are used in various industrial processes. Zeolites are characterized by having pore openings of uniform dimensions, having a significant ion exchange capacity, and being capable of reversibly desorbing an adsorbed phase which is dispersed throughout the internal voids of the crystal without significantly displacing any atoms which make up the permanent zeolite crystal structure.

Non-zeolitic molecular sieves are based on other compositions such as aluminophosphate, silicoaluminophosphate, and silica. Representative examples of microporous molecular sieves are small-pore molecular sieves such as SAPO-34, Si-DDR, UZM-9, AlPO-14, AlPO-34, AlPO-17, SSZ-62, SSZ-13, AlPO-18, LTA, UZM-13, ERS-12, CDS-1, MCM-65, MCM-47, 4A, 5A, UZM-5, SAPO-44, SAPO-47, SAPO-17, CVX-7, SAPO-35, SAPO-56, AlPO-52, SAPO-43, medium-pore molecular sieves such as Si-MFI, Si-BEA, Si-MEL, an large-pore molecular sieves such as FAU, OFF, zeolite L, NaX, NaY, and CaY. Membranes made from some of these microporous molecular sieve materials provide separation properties mainly based on molecular sieving or a competitive adsorption mechanism. Separation with microporous molecular sieve membranes is mainly based on competitive adsorption when the pores of large- and medium-pore microporous molecular sieves are much larger than the molecules to be separated. Separation with microporous molecular sieve membranes is mainly based on molecular sieving or both molecular sieving and competitive adsorption when the pores of small-pore microporous molecular sieves are smaller or similar to one molecule but are larger than other molecules in a mixture to be separated.

A majority of inorganic microporous molecular sieve membranes supported on a porous membrane support reported to date are composed of MFI. The pores of MFI zeolites are approximately 0.5-0.6 nm, and are larger than $CO_2$, $CH_4$, and $N_2$. Lovallo et al. obtained a selectivity of about 10 for $CO_2/CH_4$ separation using a high-silica MFI membrane at 393° K (see Lovallo et al., AIChE JOURNAL, 1998, 44, 1903). The pores of FAU zeolite are approximately 0.78 nm in size, and are larger than the molecular sizes of $H_2$ and $N_2$. High separation factors have been reported for $CO_2/N_2$ mixtures using FAU-type zeolite membranes (see Kusakabe et al., INDUSTRIAL ENGINEERING CHEMICAL RESEARCH, 1997, 36, 649; Kusakabe et al., AIChE JOURNAL, 1999, 45, 1220). Permeation and adsorption experiments indicate that the high separation factors can be explained by competitive adsorption of $CO_2$ and $N_2$.

In recent years, some small-pore microporous molecular sieve membranes such as zeolite T (0.41 nm pore diameter), DDR (0.36×0.44 nm), and SAPO-34 (0.38 nm) have been prepared. These membranes possess pores that are similar in size to $CH_4$, but larger than $CO_2$ and have high $CO_2/CH_4$ selectivities due to a combination of differences in diffusivity and competitive adsorption.

Since the discovery of a series of UOP Zeolite Materials (UZMs) by Lewis et al. in most recent years, these materials have been used in catalysis, separation, and as advanced functional materials. See Lewis et al., Angew. CHEM. INT. ED., 2003, 42, 1737; WO2002036489 A1; WO2002036491 A1; WO2003068679 A1; US 6,756,030; US 2005/065016 A1; U.S. Pat. No. 7,578,993. UZM zeolite materials are a family of aluminosilicate and pure silica zeolite materials with unique framework type structure, uniform pore size, and unique properties such as ion-exchange property synthesized by a Charge Density Mismatch method. The family of zeolites that are designated as UZM-5 have now been found to have particular utility in zeolite membranes.

UZM-5 zeolites are a family of zeolites which are described in U.S. Pat. No. 6,613,302, U.S. Pat. No. 6,388,159, and U.S. Pat. No. 7,578,993, which are incorporated by reference in their entirety. The UZM-5 zeolitic compositions have a unique x-ray diffraction pattern and have an empirical formula on an anhydrous basis in terms of molar ratios of:

$$M_m^{n+}R_r^{p+}Al_{(1-x)}E_xSi_yO_z$$

where M is at least one exchangeable cation selected from the group consisting of alkali and alkaline earth metals, m is the mole ratio of M to (Al+E) and varies from about 0 to about 1.2, R is a nitrogen-containing organic cation selected from the group consisting of quaternary ammonium ions, protonated amines, protonated diamines, protonated alkanolamines, quaternary alkanolammonium ions, diquaternary ammonium ions, and mixtures thereof, r is the mole ratio of R to (Al+E) and has a value of about 0.25 to about 3.0, E is an element selected from the group consisting of Ga, Fe, and B, x is the mole fraction of E and varies from 0 to about 0.5, n is the weighted average valence of M and has a value of +1 to about +2, p is the weighted average valence of R and has a value of +1 to about +2, y is the mole ratio of Si to (Al+E) and varies from about 5 to about 12, and z is the mole ratio of O to Al and has a value determined by the equation:

$$z=(m \cdot n+r \cdot p+3+4 \cdot y)/2$$

the zeolite is characterized in that it has at least two x-ray diffraction peaks, one at a d-spacing of 3.84±0.07 Å and one at a d-spacing of 8.55±0.25 Å.

The above-described UZM-5 zeolites are prepared by forming a reaction mixture (or called UZM-5 zeolite-forming gel) containing reactive sources of R, Al, Si and optionally E and/or M and heating the reaction mixture (or called UZM-5 zeolite-forming gel) at a temperature of about 100° to about 175° C., the reaction mixture having a composition expressed in terms of mole ratios of the oxides of:

$$aM_{2/n}O:bR_{2/p}O:(1-c)Al_2O_3:cE_2O_3:dSiO_2:eH_2O$$

where "a" has a value of about 0 to about 2.0, "b" has a value of about 1.5 to about 30, "c" has a value of about 0 to about 0.5, "d" has a value of 5 to about 30, and "e" has a value of about 30 to about 6000.

Further details regarding the preparation of UZM-5 materials may be found in U.S. Pat. No. 6,613,302 and U.S. Pat. No. 6,982,074 incorporated by reference herein in their entireties.

The present invention involves novel UZM-5 zeolite membranes comprising UZM-5, methods for making the same, and methods of separating gases, vapors, and liquids by using these UZM-5 zeolite membranes. Specific members of this family of zeolites are UZM-5, UZM-5P and UZM-5HS.

These membranes offer several advantages over polymeric membranes, including high selectivity due to their uniform pore size, superior thermal and chemical stability, good erosion resistance, and high $CO_2$ plasticization resistance for gas, vapor, and liquid separations.

SUMMARY OF THE INVENTION

This invention pertains to novel microporous UZM-5 zeolite membranes. More particularly, the invention pertains to methods of making these membranes and their use in the separation of gases, vapors, and liquids. The microporous UZM-5 zeolite membranes comprise at least 95% UZM-5 zeolites.

The small-pore microporous UZM-5 membranes can be prepared by at least two different methods. These methods comprise either a) in-situ crystallization of one layer or multi-layers of UZM-5 zeolite crystals on a porous membrane support or b) a seeding method by in-situ crystallization of a continuous second layer of UZM-5 zeolite crystals on a seed layer of UZM-5 zeolite crystals supported on a porous membrane support. In some cases, a membrane post-treatment step can be added to improve selectivity by plugging minor cracks and defects. This post-treatment step does not change its properties or damage the membrane, or cause the membrane to lose performance with time. The membrane post-treatment step can involve coating the whole surface or part of the surface of the UZM-5 zeolite layer of the UZM-5 zeolite membranes with a thin layer of high flux polymer material such as a polydimethylsiloxane (PDMS), a fluoro-polymer, a polybenzoxazole, or a polymer with intrinsic microporosity.

In one aspect, the invention provides a method for making high selectivity small pore microporous UZM-5 zeolite membrane by in-situ crystallization of a single layer or multiple layers of UZM-5 zeolite crystals on a porous membrane support comprising the steps of: providing a porous membrane support having an average pore size of 0.1-1 μm; synthesizing an aqueous UZM-5 zeolite-forming gel; aging the UZM-5 zeolite-forming gel; contacting at least one surface of the porous membrane support with the aged UZM-5 zeolite-forming gel; heating the porous membrane support and the aged UZM-5 zeolite-forming gel to form a layer of UZM-5 zeolite crystals on at least one surface of the support or inside the pores of the support; and calcining the resulting UZM-5 zeolite membrane to remove the organic structure-directing templates and to form a layer of template-free microporous UZM-5 zeolite crystals on the porous membrane support; and in some cases when considered necessary to further improve selectivity but does not change or damage the membrane, or cause the membrane to lose performance with time, multi layers of template-free microporous UZM-5 zeolite crystals are formed on the porous membrane support by contacting the template-containing UZM-5 zeolite membrane with the aged UZM-5 zeolite-forming gel again and repeating this step at least twice followed by calcination to remove the organic structure-directing template. In some cases, a thin layer of high flux polymer material such as a polydimethylsiloxane (PDMS), a fluoro-polymer, a polybenzoxazole, or a polymer with intrinsic microporosity is coated on the whole surface or part of the surface of the template-free microporous UZM-5 layer of the microporous UZM-5 zeolite membrane. The aqueous UZM-5 zeolite-forming gel is prepared following the method described in the references of U.S. Pat. No. 6,613, 302, U.S. Pat. No. 6,388,159, and U.S. Pat. No. 6,982,074 by combining reactive sources of R, aluminum (Al), optionally E and/or M and silicon (Si) in aqueous media wherein the composition of R, Al, E, M, Si, and O in terms of mole ratios of the elements is:

$$M_m^{n+}R_r^{p+}Al_{(1-x)}E_xSi_yO_z$$

where M is at least one exchangeable cation selected from the group consisting of alkali and alkaline earth metals, "m" is the mole ratio of M to (Al+E) and varies from 0 to about 1.2, R is a nitrogen-containing organic cation selected from the group consisting of protonated amines, protonated diamines, protonated alkanolamines, quaternary ammonium ions, diquaternaryammonium ions, quaternized alkanolamines and mixtures thereof, "r" is the mole ratio of R to (Al+E) and has a value of about 0.25 to about 3.0, E is at least one element selected from the group consisting of Ga, Fe, Cr, In and B, "x" is the mole fraction of E and varies from 0 to about 0.5, "n" is the weighted average valence of M and has a value of about +1 to about +2, "p" is the weighted average valence of R and has a value of +1 to about +2, "y" is the mole ratio of Si to (Al+E) and varies from about 5 to about 12 and "z" is the mole ratio of O to (Al+E) and has a value determined by the equation:

$$z=(m \cdot n+r \cdot p+3+4 \cdot y)/2$$

In another aspect of the invention, the invention provides a method for making high selectivity microporous UZM-5 zeolite membrane by in-situ crystallization of a continuous second layer of UZM-5 zeolite crystals on a seed layer of UZM-5 zeolite crystals supported on a porous membrane support comprising the steps of: providing a porous membrane support having an average pore size of 0.1-1 µm; providing template-containing UZM-5 zeolite seeds with an average particle size of ~50 nm to 2 µm synthesized by a hydrothermal synthesis method as described in the references of U.S. Pat. No. 6,613,302, U.S. Pat. No. 6,388,159, and U.S. Pat. No. 6,982,074 by combining reactive sources of R, aluminum (Al), optionally E and/or M and silicon (Si) in aqueous media or a microwave assisted hydrothermal synthesis method; dispersing the template-containing UZM-5 zeolite seed particles in a solvent to prepare a colloidal solution of the seeds; coating a layer of the colloidal solution of the template-containing UZM-5 zeolite seeds on at least one surface of the porous membrane support; drying the colloidal solution layer of the template-containing UZM-5 zeolite seeds on the surface of the porous membrane support to form a seed layer of UZM-5 zeolite crystals on the porous membrane support; synthesizing an aqueous UZM-5 zeolite-forming gel comprising an organic structure-directing template; aging the UZM-5 zeolite-forming gel; contacting the surface of the seed layer of UZM-5 zeolite crystals supported on a porous membrane support with the aged UZM-5 zeolite-forming gel; heating the seeded porous membrane support and the aged UZM-5 zeolite-forming gel to form a continuous second layer of UZM-5 zeolite crystals on the seed layer of UZM-5 zeolite crystals supported on the porous membrane support; calcining the resulting template-containing dual layer UZM-5 zeolite membrane to remove the organic structure-directing template and form a dual layer template-free microporous UZM-5 zeolite crystals on the porous membrane support; and in some cases to further improve selectivity but does not change or damage the membrane, or cause the membrane to lose performance with time, multiple layers of template-free microporous UZM-5 zeolite crystals are formed on the porous membrane support by contacting the surface of the second layer of UZM-5 zeolite crystals on the seed layer of UZM-5 zeolite crystals supported on the porous membrane support with the aged UZM-5 zeolite-forming gel again and repeating this step once or more than once followed by calcination to remove the organic structure-directing template. In some cases, a thin layer of high flux polymer material such as a polydimethylsiloxane (PDMS), a fluoro-polymer, a polybenzoxazole, or a polymer with intrinsic microporosity is coated on the whole surface or part of the surface of the template-free microporous UZM-5 layer of the microporous UZM-5 zeolite membrane.

The methods of the current invention for producing defects free high selectivity microporous UZM-5 zeolite membranes are suitable for large scale membrane production.

The microporous UZM-5 zeolite membrane in this invention has selectivity significantly higher than many polymer membranes for separations. The preferred microporous UZM-5 zeolite used for the preparation of the microporous UZM-5 zeolite membrane in the current invention is selected from the group consisting of nano-sized microporous UZM-5 zeolites, nano-sized microporous UZM-5P zeolites, and nano-sized microporous UZM-5HS zeolites with particle size <1 µm.

The high flux polymer that serves as a coating layer on the whole surface or part of the surface of the UZM-5 zeolite layer of the microporous UZM-5 zeolite membranes is selected from the group consisting of high flux polydimethylsiloxanes, fluoro-polymers, polybenzoxazoles, polymers with intrinsic microporosity, or a mixture thereof.

The microporous UZM-5 zeolite membranes can be made in the form of disk, tube, or hollow fiber fabricated by the methods described in the current invention. These membranes have superior thermal and chemical stability, good erosion resistance, high $CO_2$ plasticization resistance, and significantly improved selectivity over polymer membranes for gas, vapor, and liquid separations, such as carbon dioxide/methane ($CO_2/CH_4$), hydrogen sulfide/methane ($H_2S/CH_4$), carbon dioxide/nitrogen ($CO_2/N_2$), oxygen/nitrogen ($O_2/N_2$), and hydrogen/methane ($H_2/CH_4$) separations.

The invention provides a process for separating at least one gas from a mixture of gases using the microporous UZM-5 zeolite membranes described in the present invention. The process comprises: providing a microporous UZM-5 zeolite membrane which is permeable to said at least one gas; contacting the mixture on one side of the microporous UZM-5 zeolite membrane to cause said at least one gas to permeate the microporous UZM-5 zeolite membrane; and removing from the opposite side of the membrane a permeate gas composition comprising a portion of said at least one gas which permeated said membrane.

The microporous UZM-5 zeolite membranes of the present invention are useful for liquid separations such as deep desulfurization of gasoline and diesel fuels, ethanol/water separations, and pervaporation dehydration of aqueous/organic mixtures, as well as for a variety of gas and vapor separations such as $CO_2/CH_4$, $CO_2/N_2$, $H_2/CH_4$, $O_2/N_2$, olefin/paraffin such as propylene/propane, iso/normal paraffins separations, polar molecules such as $H_2O$, $H_2S$, and $NH_3$/mixtures with $CH_4$, $N_2$, $H_2$, and other light gases separations.

The invention claimed is:

1. A method for making a microporous inorganic UZM-5 zeolite membrane by in-situ crystallization of a continuous single layer or continuous multiple layers of UZM-5 zeolite crystals on a porous membrane support comprising the steps of:

(a) providing a porous inorganic membrane support;
(b) synthesizing an aqueous UZM-5 zeolite-forming gel by combining reactive sources of R, aluminum (Al), optionally E and/or M and silicon (Si) in aqueous media wherein the composition of R, Al, E, M, Si, and O in terms of mole ratios of the elements is:

$$M_m^{n+}R_r^{p+}Al_{(1-x)}E_xSi_yO_z$$

where M is at least one exchangeable cation selected from the group consisting of alkali and alkaline earth metals, "m" is the mole ratio of M to (Al+E) and varies from 0 to about 1.2, R is a nitrogen-containing organic cation selected from the group consisting of protonated amines, protonated diamines, protonated alkanolamines, quaternary ammonium ions, diquaternaryammonium ions, quaternized alkanolamines and mixtures thereof, "r" is the mole ratio of R to (Al+E) and has a value of about 0.25 to about 3.0, E is at least one element selected from the group consisting of Ga, Fe, Cr, In and B, "x" is the mole fraction of E and varies from 0 to about 0.5, "n" is the weighted average valence of M and has a value of about +1 to about +2, "p" is the weighted average valence of R and has a value of +1 to about +2, "y" is the mole ratio of Si to (Al+E) and varies from about 5 to about 12 and "z" is the mole ratio of O to (Al+E) and has a value determined by the equation:

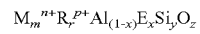
$z=(m \cdot n+r \cdot p+3+4 \cdot y)/2;$ (c) aging the UZM-5 zeolite-forming gel at 25° to 100° C. for 1 to 120 hours to produce an aged UZM-5 zeolite-forming gel;
(d) contacting at least one surface of the porous inorganic membrane support with the aged UZM-5 zeolite-forming gel;
(e) heating the porous inorganic membrane support and the aged UZM-5 zeolite-forming gel to form a continuous layer of UZM-5 zeolite crystals on at least one surface of the porous inorganic membrane support or inside the pores of the porous inorganic membrane support to produce a UZM-5 zeolite membrane;
(f) calcining the resulting inorganic UZM-5 zeolite membrane at high temperature in a range of 400° to 600° C. to form a microporous inorganic UZM-5 zeolite membrane; and
(g) coating the whole surface or part of the surface of said layer of UZM-5 zeolite crystals of the said microporous inorganic UZM-5 zeolite membrane with a thin layer of high flux polymer material selected from the group consisting of a polydimethylsiloxane (PDMS), a polybenzoxazole, a polymer with intrinsic microporosity, or a mixture thereof;
wherein the microporous inorganic UZM-5 zeolite membrane comprises at least 95% UZM-5 zeolites.

2. The method of claim 1 further comprising contacting the UZM-5 zeolite membrane obtained in step (e) with the said aged UZM-5 zeolite-forming gel again and repeating steps (d) to (e) at least twice.

3. The method of claim 1 wherein said porous inorganic membrane support comprises pores having an average pore size of 0.1-1 μm.

4. The method of claim 1 wherein said microporous inorganic UZM-5 zeolite membrane is in a form selected from the group consisting of disk, tube and hollow fiber.

5. A method for making a microporous inorganic UZM-5 zeolite membrane comprising
(a) providing a porous inorganic membrane support having an average pore size of 0.1-1 μm;
(b) providing UZM-5 zeolite seeds in the as synthesized form with an average particle size of about 10 nm to 2 μm;
(c) dispersing the UZM-5 zeolite seed particles in the as synthesized form in a solvent to prepare a colloidal solution of the UZM-5 zeolite seed particles;
(d) coating a layer of the colloidal solution of the UZM-5 zeolite seed particles on at least one surface of the porous inorganic membrane support;
(e) drying the colloidal solution layer of the UZM-5 zeolite seed particles on the surface of the porous inorganic membrane support to form a seed layer of UZM-5 zeolite crystals on the porous inorganic membrane support;
(f) synthesizing an aqueous UZM-5 zeolite-forming gel by combining reactive sources of R, aluminum (Al), optionally E and/or M and silicon (Si) in aqueous media wherein the composition of R, Al, E, M, Si, and O in terms of mole ratios of the elements is:

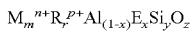

where M is at least one exchangeable cation selected from the group consisting of alkali and alkaline earth metals, "m" is the mole ratio of M to (Al+E) and varies from 0 to about 1.2, R is a nitrogen-containing organic cation selected from the group consisting of protonated amines, protonated diamines, protonated alkanolamines, quaternary ammonium ions, diquaternaryammonium ions, quaternized alkanolamines and mixtures thereof, "r" is the mole ratio of R to (Al+E) and has a value of about 0.25 to about 3.0, E is at least one element selected from the group consisting of Ga, Fe, Cr, In and B, "x" is the mole fraction of E and varies from 0 to about 0.5, "n" is the weighted average valence of M and has a value of about +1 to about +2, "p" is the weighted average valence of R and has a value of +1 to about +2, "y" is the mole ratio of Si to (Al+E) and varies from about 5 to about 12 and "z" is the mole ratio of O to (Al+E) and has a value determined by the equation:

$$z=(m \cdot n + r \cdot p + 3 + 4 \cdot y)/2;$$

(g) aging the UZM-5 zeolite-forming gel at 25° to 100° C. for 1 to 120 hours to produce an aged UZM-5 zeolite-forming gel;
(h) contacting the surface of the seed layer of UZM-5 zeolite crystals supported on a porous inorganic membrane support with the aged UZM-5 zeolite-forming gel;
(i) heating the seeded porous inorganic membrane support and the aged UZM-5 zeolite-forming gel to form a continuous second layer of inorganic UZM-5 zeolite crystals on the seed layer of UZM-5 zeolite crystals supported on the porous inorganic membrane support;
(j) calcining the resulting dual layer inorganic UZM-5 zeolite membrane at high temperature in a range of 400° to 600° C. to form a microporous inorganic UZM-5 zeolite membrane; and
(k) coating the whole surface or part of the surface of said layer of UZM-5 zeolite crystals of the said microporous inorganic UZM-5 zeolite membrane with a thin layer of high flux polymer material selected from the group consisting of a polydimethylsiloxane (PDMS), a polybenzoxazole, a polymer with intrinsic microporosity, or a mixture thereof;
wherein the microporous inorganic UZM-5 zeolite membrane comprises at least 95% UZM-5 zeolites.

6. The method of claim 5 further comprising contacting the inorganic UZM-5 membrane obtained in step (i) with the said aged UZM-5 zeolite-forming gel again and repeating steps (h) to (i) at least one time.

7. The method of claim 5 wherein said UZM-5 zeolite seeds in the as synthesized form are synthesized by a hydrothermal synthesis method or a microwave assisted hydrothermal synthesis method.

8. The method of claim 5 wherein said membrane is in a form selected from the group consisting of disk, tube and hollow fiber.

9. A process for separating at least one gas from a mixture of gases comprising:
(a) providing a microporous inorganic UZM-5 zeolite membrane which is permeable to said at least one gas;
(b) contacting the mixture on one side of the microporous inorganic UZM-5 zeolite membrane to cause said at least one gas to permeate the microporous inorganic UZM-5 zeolite membrane; and
(c) removing from the opposite side of the membrane a permeate gas composition comprising a portion of said at least one gas;
wherein the microporous inorganic UZM-5 zeolite membrane comprise at least 95% UZM-5 zeolites.

10. The process of claim 9 wherein said mixture of gases is selected from the group consisting of $CO_2/CH_4$, $H_2S/CH_4$, $N_2/CH_4$, $CO_2/H_2$, $CO_2/N_2$, $H_2/CH_4$, $O_2/N_2$, olefin/paraffin mixtures and iso/normal paraffins.

11. The process of claim 9 wherein mixture of gases are mixtures of at least one gas selected from the group consisting of $H_2O$, $H_2S$, and $NH_3$/mixtures with at least one gas selected from the group consisting of $CH_4$, $N_2$, and $H_2$.

12. A microporous inorganic UZM-5 zeolite membrane.

13. The microporous inorganic UZM-5 zeolite membrane of claim 12 wherein said UZM-5 zeolite is nano-sized UZM-5 zeolite with particle size <1 μm.

14. The microporous inorganic UZM-5 zeolite membrane of claim 12 wherein said UZM-5 zeolite is selected from the group consisting of UZM-5, UZM-5P and UZM-5HS.

\* \* \* \* \*